Inventor:
Ralph M. Rowell,
by Rowell & Mack
His Attorney.

Patented Apr. 3, 1951

2,547,665

UNITED STATES PATENT OFFICE 2,547,665

EXPANDED SCALE DIRECT-CURRENT MEASURING INSTRUMENT WITH POLARIZED CORE

Ralph M. Rowell, Lynn, Mass., assignor to General Electric Company, a corporation of New York Application June 9, 1948, Serial No. 31,963

3 Claims. (Cl. 171—95)

My invention relates to direct current measuring instruments of the type employing a stationary magnet field and a moving armature coil, and its object is to provide means for controlling the scale distribution in an efficient manner. In carrying my invention into effect, I employ an instrument core within the moving coil which is a permanent magnet polarized along an axis which is at an angle to the normal flux axis produced by the stationary field. The invention is useful in connection with measuring instruments which would normally have the scale distribution crowded at one end. By means of my invention the crowded end of such an instrument scale distribution may be materially expanded by orienting the permanent magnet core, so that its flux adds to the main field flux in the operation of the instrument where the scale distribution tends to be crowded, and may oppose the main field flux in the operation of the instrument in the range where the scale distribution tends to be expanded.

Figure 1:
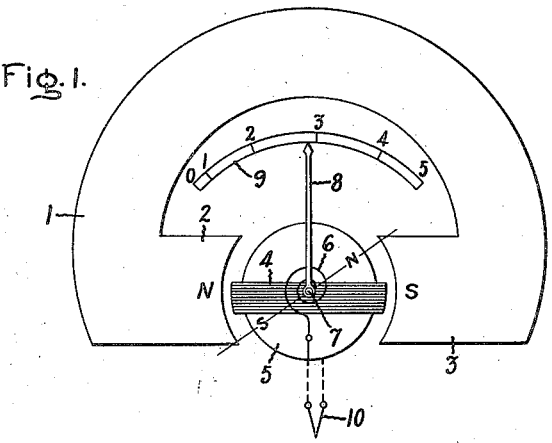
Figure 2:
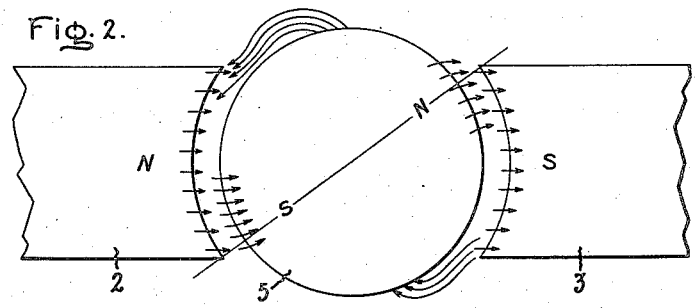
Figure 3:
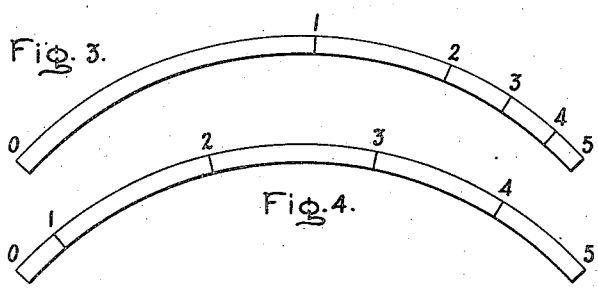
Figure 4:
Figure 5:
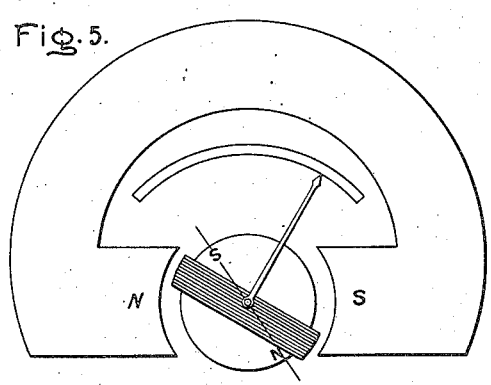

The features of my invention which are believed to be novel and patentable will be pointed out in the claims appended hereto. For a better understanding of my invention reference is made in the following description to the accompanying drawing in which Fig. 1 represents a plan view of a structural embodiment of my invention, arranged to obtain scale expansion at the lower end of the scale. Fig. 2 represents the nature of the field flux distribution of the instrument of Fig. 1. Figs. 3 and 4 represent different scale distributions obtainable with my invention under different circumstances. Fig. 5 represents the disposition of the permanent magnet core for expansion at the upper end of the scale.

In Fig. 1, 1 represents a normal form of stationary permanet magnet field having pole pieces 2 and 3 shaped to provide a circular air gap in which an armature coil 4 is rotatively mounted. The pole pieces 2 and 3 are preferably an integral part of the permanent magnet 1 and permanently magnetized as indicated. A circular core 5 which is a high quality permanent magnet is contained within the coil 4. The instrument is provided with spiral spring leading-in conductors one of which is indicated at 6, a pivoted shaft 7, a pointer 8 secured to the shaft and armature coil 4, and a scale 9 on which the pointer 8 indicates. In Fig. 1, the permanent magnet core 5 is oriented so that its line of polarization, designated by S and N, is at an angle of 30 degrees to the line of opposite polarization, designated N and S, produced by the stationary field magnet 1 through the region occupied by the armature coil 4. The primary purpose of this is to expand the scale distribution over the lower end of the scale in an instrument of a type which would otherwise have the lower end of its scale very crowded. For instance, assume that the instrument in question is energized from a thermocouple 10 and thus constitutes a thermal ammeter with a temperature graduated scale. The heating of the thermocouple is proportional to the square of the current and produces, on a normal indicating instrument, a so-called square-law distribution which is very crowded at the lower end. For example, on a normal five-milliampere instrument of the thermocouple type, the one-milliampere point graduated in temperature units would be located at $1/25$ scale, whereas if the current-scale graduation relation were linear and uniform, it would be at $1/5$ scale.

The present invention is used in Fig. 1 to greatly expand the lower part of the scale in such an instrument so as to produce a scale distribution such as represented. The scale distribution over the lower portion of the scale is doubled, while that over the upper portion of the scale is halved approximately in comparison to what would be expected in a normal thermal ammeter instrument. The reason for this is illustrated in Fig. 2, where the arrows that touch the core 5 generally indicate the flux distribution due to the permanent magnet core 5, and the arrows which touch the pole pieces 2 and 3 generally indicate the flux distribution due to the permanent magnet 1. It is seen that the core flux adds substantially to the field flux near the lower side of pole piece 2 and near the upper side of pole piece 3, and that the core flux subtracts slightly from the field flux at the upper edge of pole piece 2 and at the lower edge of pole piece 3. Thus, near the lower end of the scale the armature coil 4 will be in an intense magnetic field, and near the upper end of the scale the armature coil will be in a much weaker magnetic field. Thus, the instrument deflection is increased and expanded over the lower end portion of the scale and decreased and reduced over the upper end portion of the scale.

Fig. 3 shows the scale distribution obtained with this invention in a linear circuit instrument; that is, with the scale graduated in amperes, where the angle between the lines of reverse polarization of the two permanent magnet fields is made 45 degrees. If the core 5 were of soft iron, the scale in Fig. 3 would be substantially uniform. Fig. 4 shows the scale distribution obtained with this invention in a thermal ammeter instrument where the angle between the two permanent magnet fields is made 45 degrees.

Fig. 5 represents the application of the invention for expansion of the upper end of an instrument scale.

While this invention permits of modifying instrument deflection characteristics without using inefficient nonuniform armature air gaps, it can be combined with one or more of such expedients heretofore employed for this purpose. Thus, it is not essential to the use of my invention that the core 5 be circular or that the pole pieces 2 and 3 be shaped to provide a uniform air gap, or be of uniform depth over their pole faces.

The extent of scale distribution modification obtained with this invention may be altered by adjustment of the strength of the permanent magnet core 5 and its angular position. It should be noted that any change which results in an over-all change in the resultant field strength of the instrument will change the over-all torque of the instrument for a given current input range, but that this can be offset, if desired within reasonable limits, by correspondingly changing the spiral spring zero return torque. The presence of or the angular position of the polarized core 5, however, does not of itself change the instrument zero, since with zero current there is zero instrument torque irrespective of the field strength.

It is to be noted that although the polarized core 5 is used primarily for scale distribution purposes, its flux is predominantly contributing to the main field flux, and to the extent to which this is true it increases the over-all torque sensitivity of the instrument for a given armature current and is, therefore, beneficial for that reason alone.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A direct current electrical measuring instrument, comprising a stationary field magnet containing an armature air gap and magnetized to produce a unidirectional flux across said air gap, a circular core member within the air gap and spaced from the pole faces of the stationary magnet and producing a uniform circular air gap between the field magnet and core member, an armature coil mounted for rotation between the core and stationary magnet, said core containing permanent magnet material polarized to produce a predominately contributing flux in the armature air gap at an angle to the flux produced by the field magnet in such gap for the purpose of modifying the deflection characteristics of the instrument.

2. A direct current measuring instrument, comprising a stationary permanent magnet field member having pole pieces spaced apart by an armature air gap, a circular permanent magnet core member within said gap and spaced from the field magnet pole pieces and providing a uniform circular air gap between the field magnet and core member, an armature coil mounted for rotation between the field magnet and core, said permanent magnet core being polarized to produce a predominately contributing flux in a direction of from 30 to 45 degrees to that produced by the field magnet for the purpose of varying the intensity of the field in which the armature moves over its range of operation.

3. A direct current type of measuring instrument, comprising a stationary permanent magnet field structure provided with pole pieces spaced apart to provide an armature air gap and producing a flux across said gap, a permanent magnet core member contained within said gap and spaced from said pole pieces, said core being circular and concentric to the pole faces of the stationary field magnet, an armature coil pivoted for rotation about said core and between it and said pole pieces, said core being polarized across a diameter thereof and oriented so that its flux axis is at a predominately contributing angle to the direction of flux produced by the stationary permanent magnet field structure in the armature air gap, such that the core flux adds substantially to the field flux over one portion of the range of armature operation and subtracts slightly from the field flux over a different portion of the range of armature operation.

RALPH M. ROWELL.

REFERENCES CITED

The following references are of record in the file of this patent:

UNITED STATES PATENTS

| Number | Name | Date |
| --- | --- | --- |
| 1,782,588 | Terman | Nov. 25, 1930 |

FOREIGN PATENTS

| Number | Country | Date |
| --- | --- | --- |
| 3,103 | Great Britain | Jan. 11, 1890 |
| 48,595 | France | Apr. 5, 1938 |
| 514,349 | Great Britain | Jan. 21, 1938 |